United States Patent
Mallory et al.

(10) Patent No.: US 7,007,612 B2
(45) Date of Patent: Mar. 7, 2006

(54) LAPTOP COMPUTER SUPPORT SYSTEM

(76) Inventors: Robert L. Mallory, 22526 NE. 19th Pl., Sammamish, WA (US) 98074; David W. Mallory, 616 4th Ave. West, Apartment 304, Seattle, WA (US) 98119

(*) Notice: Subject to any disclaimer, the term of this patent is extended or adjusted under 35 U.S.C. 154(b) by 0 days.

(21) Appl. No.: 10/386,095

(22) Filed: Mar. 10, 2003

(65) Prior Publication Data

US 2003/0168558 A1 Sep. 11, 2003

Related U.S. Application Data

(60) Provisional application No. 60/363,634, filed on Mar. 11, 2002.

(51) Int. Cl.
*A47B 3/00* (2006.01)
*A47B 9/16* (2006.01)

(52) U.S. Cl. ............... 108/36; 108/147.22; 248/188.2
(58) Field of Classification Search ............... 248/166, 248/165, 163.1, 440, 460, 463, 464, 918, 248/188.2; 108/96, 115, 117, 25, 147.22, 108/34–36, 144.11
See application file for complete search history.

(56) References Cited

U.S. PATENT DOCUMENTS

| | | | | |
|---|---|---|---|---|
| 4,833,998 A | * | 5/1989 | Everett et al. | 108/36 |
| 5,067,417 A | * | 11/1991 | Marmentini et al. | 108/36 |
| 5,325,794 A | * | 7/1994 | Hontani | 108/117 |
| 5,913,271 A | * | 6/1999 | Lloyd | 108/132 |
| 6,044,758 A | * | 4/2000 | Drake | 100/43 |
| 6,170,405 B1 | * | 1/2001 | Weitzman et al. | 108/25 |
| 6,192,809 B1 | * | 2/2001 | Riach et al. | 108/115 |
| 6,311,944 B1 | * | 11/2001 | McKsymick et al. | 248/461 |
| D455,025 S | * | 4/2002 | Weitzman et al. | D6/406.5 |
| 6,439,133 B1 | * | 8/2002 | Jaramillo | 108/25 |
| 6,529,369 B1 | * | 3/2003 | Zarek et al. | 361/680 |
| 6,675,722 B1 | * | 1/2004 | Stathis et al. | 108/50.02 |
| 2003/0168558 A1 | * | 9/2003 | Mallory et al. | 248/163.1 |

* cited by examiner

*Primary Examiner*—Anita King
*Assistant Examiner*—Tan Le (57) ABSTRACT

A laptop computer support system for elevating a laptop to a comfortable viewing level and adequate space for an external keyboard. The laptop computer support system includes a support frame, at least one support platform attached to the support frame, and a first support leg and a second support leg pivotally attached to opposing sides of the support frame. A first cable and a second cable are attachable to the first support leg and the second support leg respectively to prevent the legs from extending outwardly too far. Front and rear riser members are preferably attached to the legs for allowing height and angle adjustment.

14 Claims, 8 Drawing Sheets

LAPTOP COMPUTER SUPPORT SYSTEM

CROSS REFERENCE TO RELATED APPLICATIONS

I hereby claim benefit under Title 35, United States Code, Section 119(e) of U.S. provisional patent application Ser. No. 60/363,634 filed Mar. 11, 2002. The No. 60/363,634 application is currently pending. The Ser. No. 60/363,634 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to computer support devices and more specifically it relates to a laptop computer support system for elevating a laptop to a comfortable viewing level and adequate space for an external keyboard.

2. Description of the Related Art

Laptop computers are designed to be foldable into a compact storage structure when not in use. Laptop computers are basically comprised of a base structure and a display monitor pivotally attached to one another. The base structure houses the processing unit, hard-drive, CD-ROM drive and other electrical components. Users typically position the laptop computers upon tables, desks and the like.

Unfortunately, conventional laptop computers have relatively small and ergonomically incorrect keyboards making it difficult for the user to utilize over extended periods of time. A user may connect an external keyboard to solve this problem, but this requires additional desktop space which is not always available. A further problem with conventional laptop computers is that the display monitor is typically not a suitable viewing level because the monitor is pivotally attached to the base structure which is positioned upon the support surface.

Recently, laptop support stands have been provided that attempt to solve some of the inherent problems with laptop computers. Unfortunately, these attempted solutions are typically bulky, heavy, not ventilated, difficult to utilize, and have limited adjustability and portability.

While these devices may be suitable for the particular purpose to which they address, they are not as suitable for elevating a laptop to a comfortable viewing level and allowing adequate space for an external keyboard and mouse. Existing laptop support devices are not suitable for supporting a laptop computer for usage on a desk top while also providing a lightweight, compact portable device for use away from a desk.

In these respects, the laptop computer support system according to the present invention substantially departs from the conventional concepts and designs of the prior art, and in so doing provides an apparatus primarily developed for the purpose of elevating a laptop computer to a comfortable viewing level and providing adequate space for an external keyboard and mouse in a configuration that is substantially more compact and portable than prior art. In doing so, this device provides for a greater range of unrestricted usages, whether on a desk top or away from a desk.

BRIEF SUMMARY OF THE INVENTION

In view of the foregoing disadvantages inherent in the known types of computer support devices now present in the prior art, the present invention provides a new laptop computer support system construction wherein the same can be utilized for elevating a laptop to a comfortable viewing level and adequate space for an external keyboard.

The general purpose of the present invention, which will be described subsequently in greater detail, is to provide a new laptop computer support system that has many of the advantages of the computer support devices mentioned heretofore and many novel features that result in a new laptop computer support system which is not anticipated, rendered obvious, suggested, or even implied by any of the prior art computer support devices, either alone or in any combination thereof.

To attain this, the present invention generally comprises a support frame, at least one support platform attached to the support frame, and a first support leg and a second support leg pivotally attached to opposing sides of the support frame. A first cable and a second cable are attachable to the first support leg and the second support leg respectively to prevent the legs from extending outwardly too far. Front and rear riser members are preferably attached to the legs for allowing angle adjustment.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a laptop computer support system that will overcome the shortcomings of the prior art devices.

A second object is to provide a laptop computer support system for elevating a laptop to a comfortable viewing level and adequate space for an external keyboard and mouse.

Another object is to provide a laptop computer support system that is lightweight, compact, durable, rugged, simple to install/uninstall, and is adjustable.

An additional object is to provide a laptop computer support system that has not sharp edges or laptop damaging extrusions.

A further object is to provide a laptop computer support system that is foldable into a support position that is resistant to collapse and a compact storage position.

Another object is to provide a laptop computer support system that may be utilized in various situations such as upon a table, chair, bed, sofa, ground or other structure where laptop computers may be utilized.

A further object is to provide a laptop computer support system that does not obstruct the user's operation of peripheral devices such as but not limited to a computer mouse, printer or external keyboard.

Another object is to provide a laptop computer support system that does not obstruct the usage, operation and access to the laptop computer such as but not limited to a CD or DVD tray.

A further object is to provide a laptop computer support system that is capable of supporting various styles, types and weights of laptop computers.

A further object is to provide a laptop computer support system that provides adequate ventilation and heat dissipation for a laptop computer.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 8 illustrate a laptop computer support system 10, which comprises a support frame, at least one support platform 30 attached to the support frame, and a first support leg 40 and a second support leg 42 pivotally attached to opposing sides of the support frame. A first cable 60 and a second cable 62 are attachable to the first support leg 40 and the second support leg 42 respectively to prevent the legs from extending outwardly too far. Front and rear riser members 50 are preferably attached to the legs for allowing angle adjustment.

Figure 1:
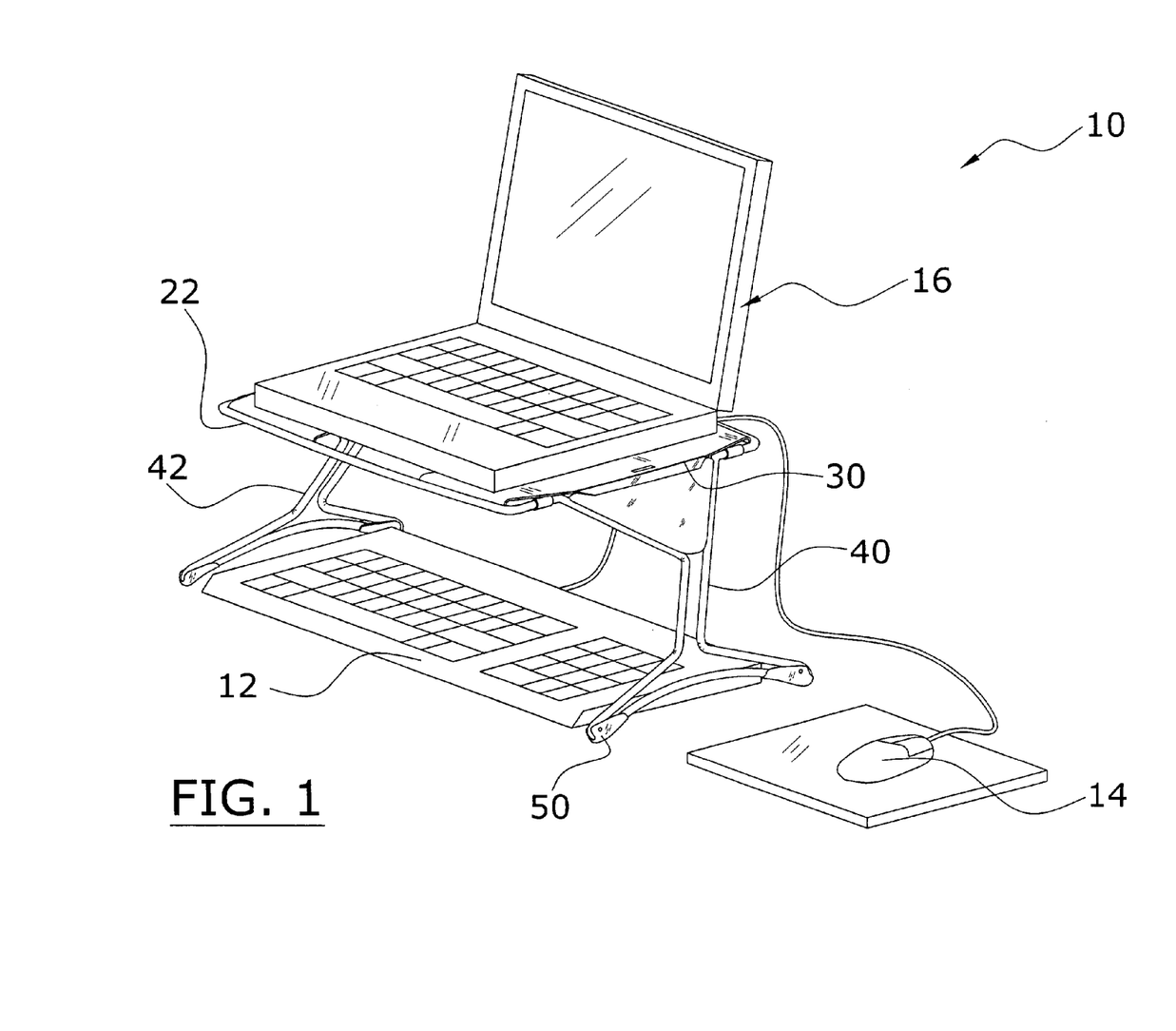
FIG. 1 is an upper perspective view of the present invention supporting a laptop computer above an external keyboard.

The support frame has a size and shape sufficient for receiving and supporting a laptop computer 16 as shown in FIG. 1 of the drawings. The support frame is preferably comprised of a rectangular structure, but various other shapes may be utilized as further shown in FIGS. 2 and 5 of the drawings.

Figure 5:
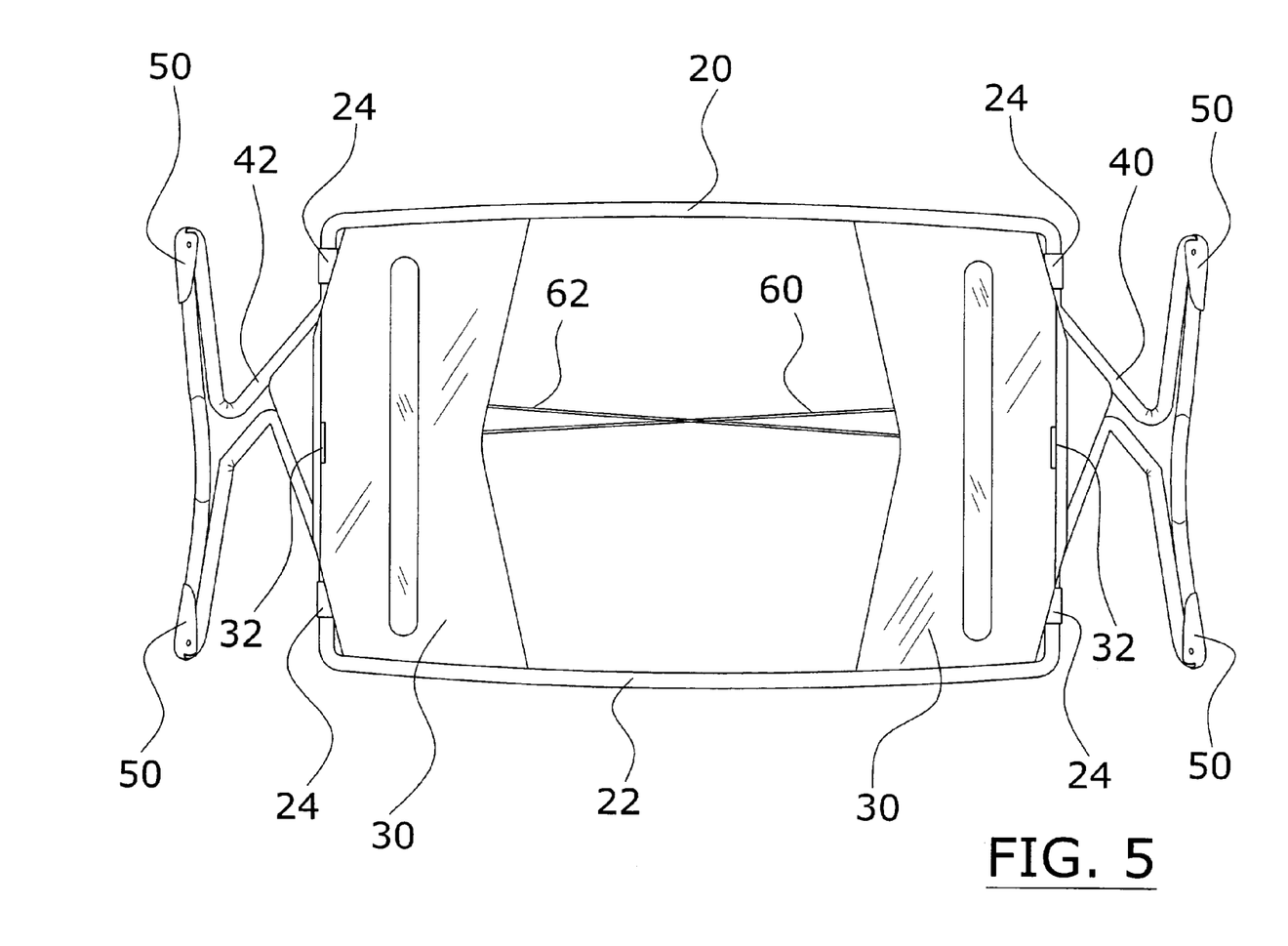
FIG. 5 is a top view of the present invention in the support position.

The support frame may be comprised of a single solid structure or a structure comprised of various sections. For example, FIG. 5 illustrates the usage of a rear support frame 20 and a front support frame 22 positioned in opposition to one another with the support legs 40, 42 pivotally attached between thereof. A plurality of connector members 24 are attached to the rear support frame 20 and the front support frame 22 for pivotally receiving and supporting the distal ends of the support legs 40, 42.

Figure 2:
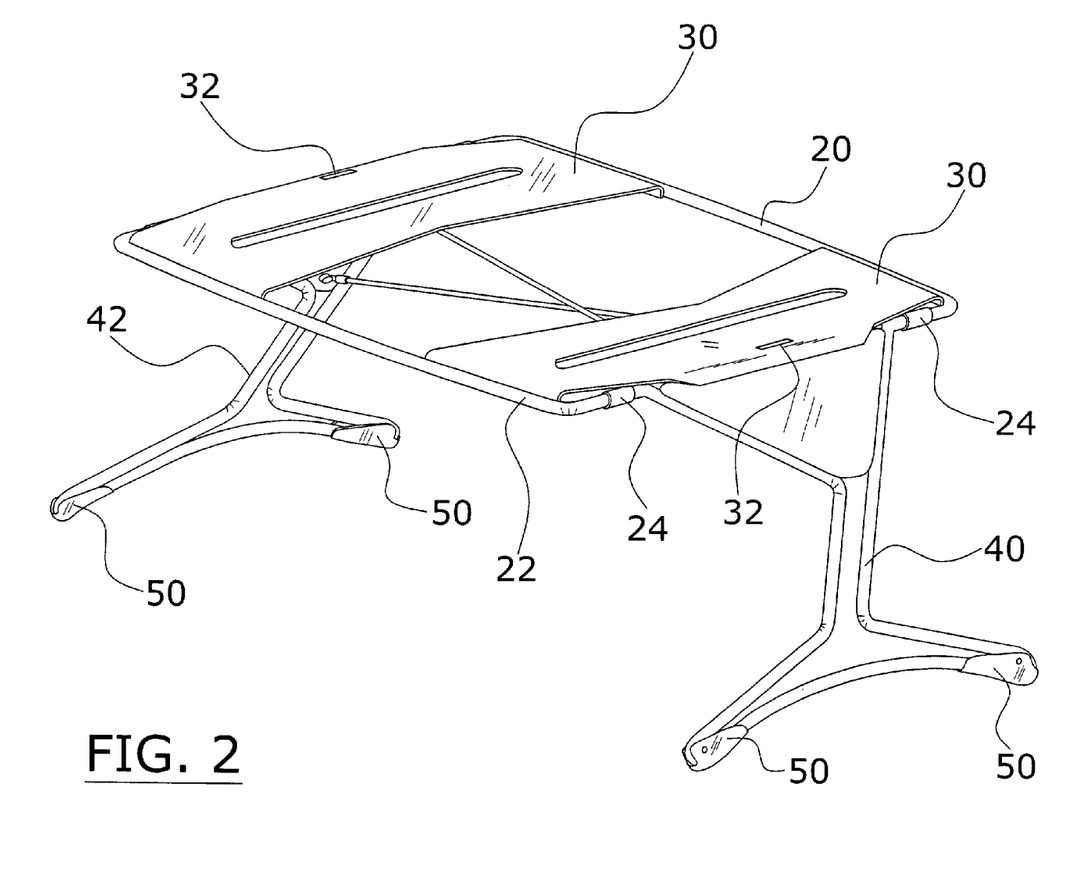
FIG. 2 is an upper perspective view of the present invention in the support position.

The support preferably has at least one support platform 30 for supporting the laptop computer 16. At least one support platform 30 is preferably comprised of a first support platform 30 and a second support platform 30 attached to opposing sides of the support frame with a space between thereof as best illustrated in FIGS. 2 and 5 of the drawings. The space between the support platforms 30 allows for adequate ventilation and heat dissipation for the laptop computer 16. The support platform 30 preferably includes at least one recessed rib which provides additional stiffness to the support platform 30.

Figure 3:
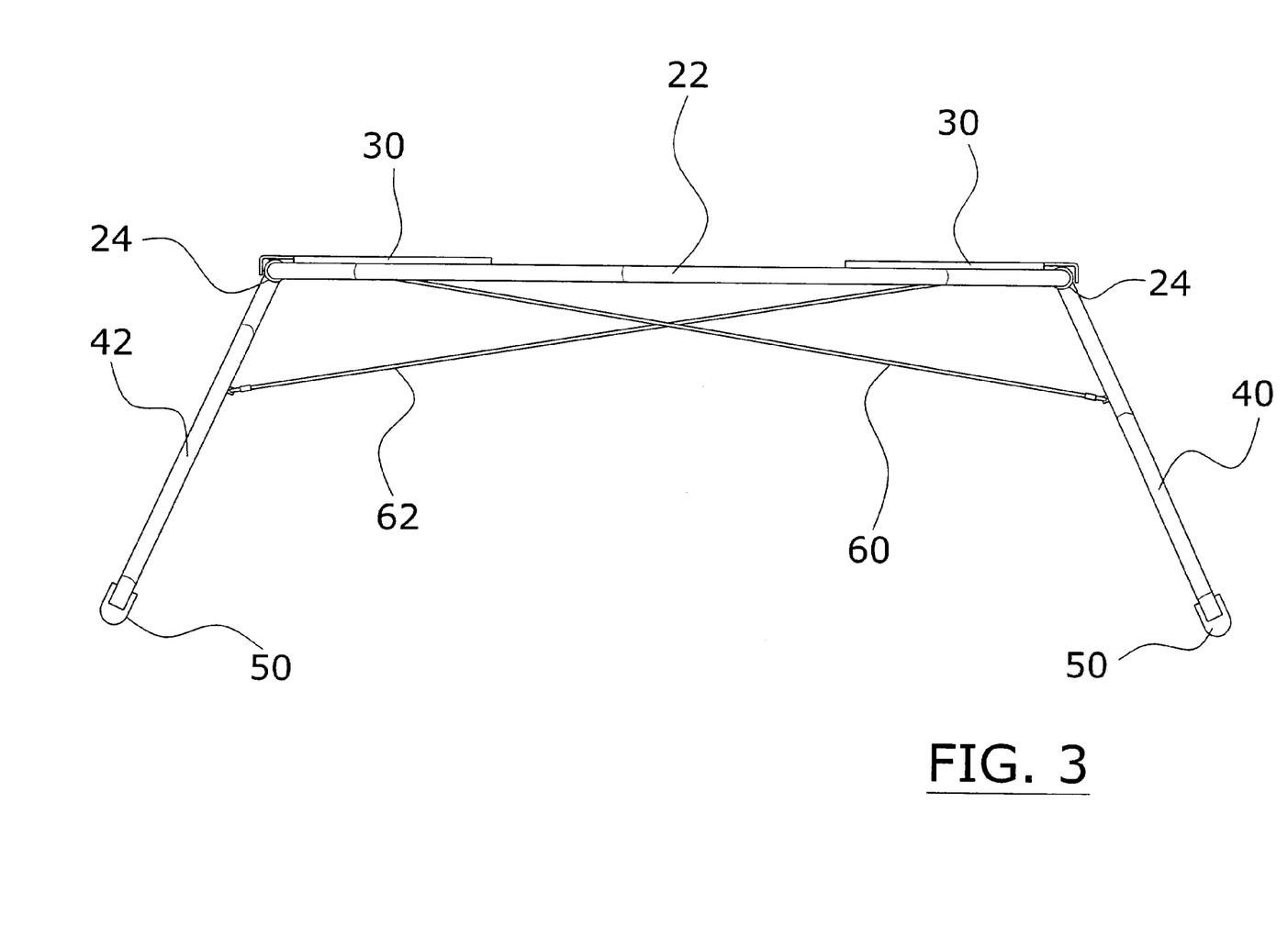
FIG. 3 is a front view of the present invention in the support position.
Figure 4:
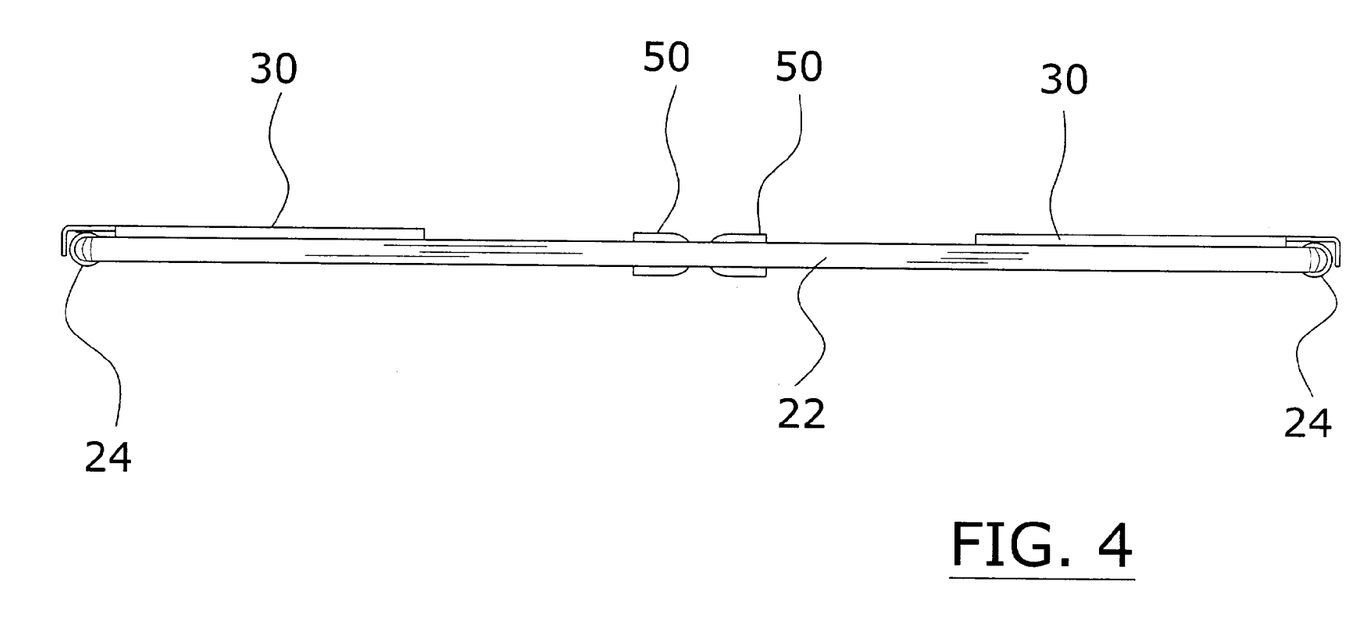
FIG. 4 is a front view of the present invention in the storage position.

As shown in FIGS. 1, 2 and 3 of the drawings, a first support leg 40 and a second support leg 42 are pivotally attached to a first side and a second side of the support frame respectively. The support legs 40, 42 preferably pivot either toward or away from one another for allowing extension thereof for the support position (FIG. 3) or contraction for the storage position (FIG. 4). The support legs 40, 42 may have various structures. However, the support legs 40, 42 preferably have a front cutout for reducing obstruction of the user's hand movements and other activities surrounding the laptop computer 16.

As shown in FIG. 3 of the drawings, a first cable 60 and a second cable 62 are attached between the support frame and the support legs 40, 42. The first cable 60 and the second cable 62 may also be attached between at least one support platform 30 and the support legs 40, 42.

Figure 6:
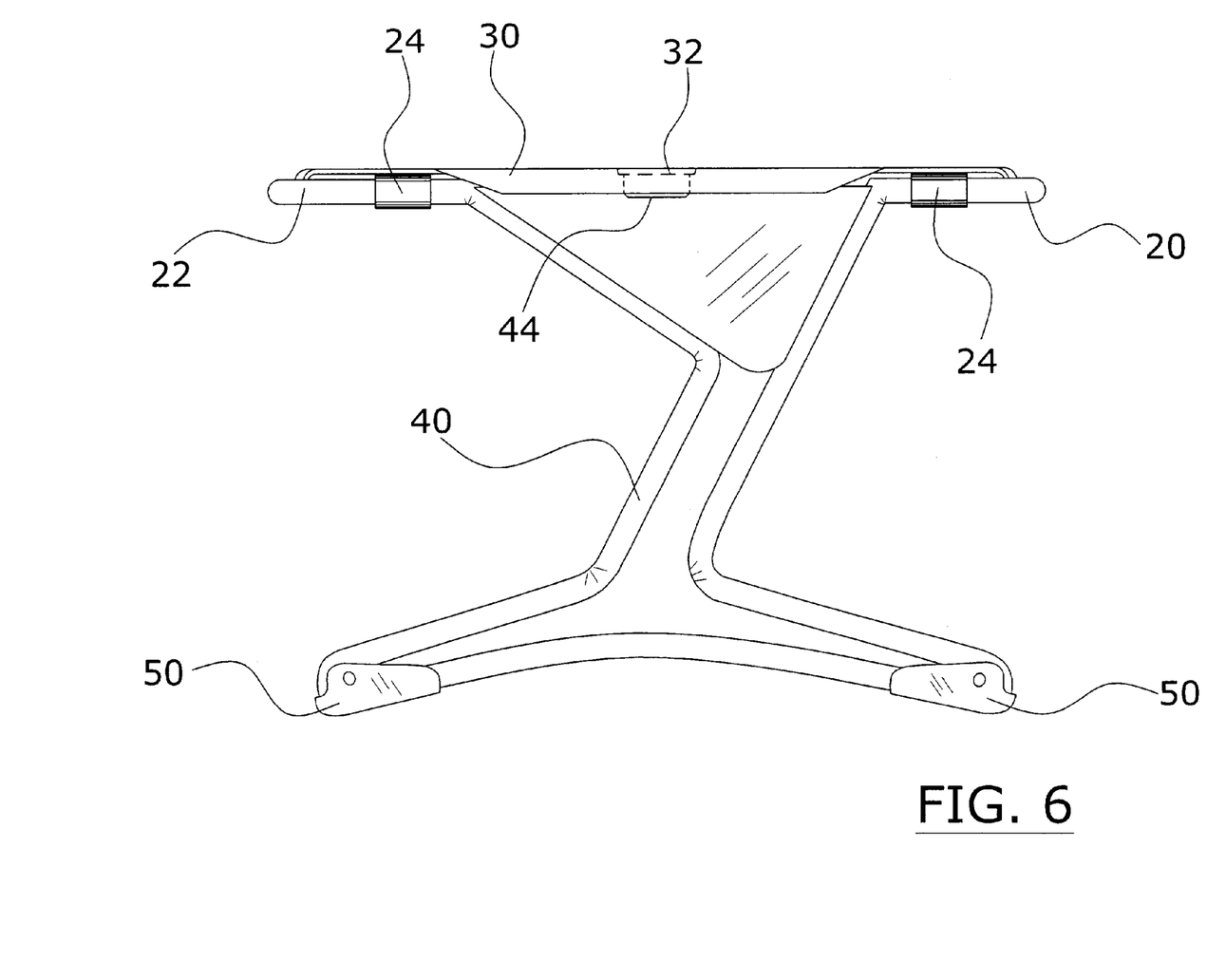
FIG. 6 is a side view of the present invention in the support position.
Figure 7:
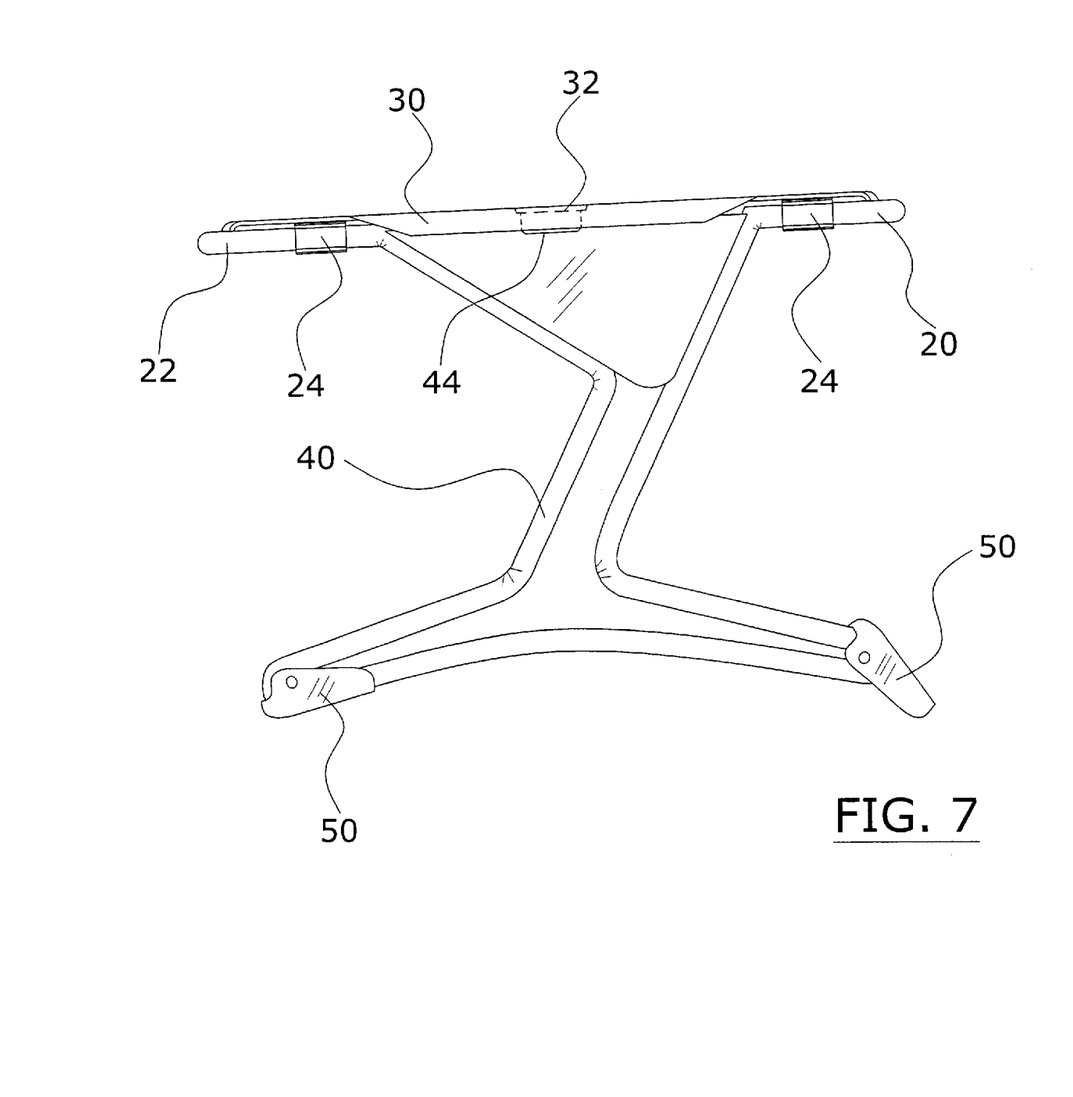
FIG. 7 is a side view of the present invention with the rear riser members extended.
Figure 8:
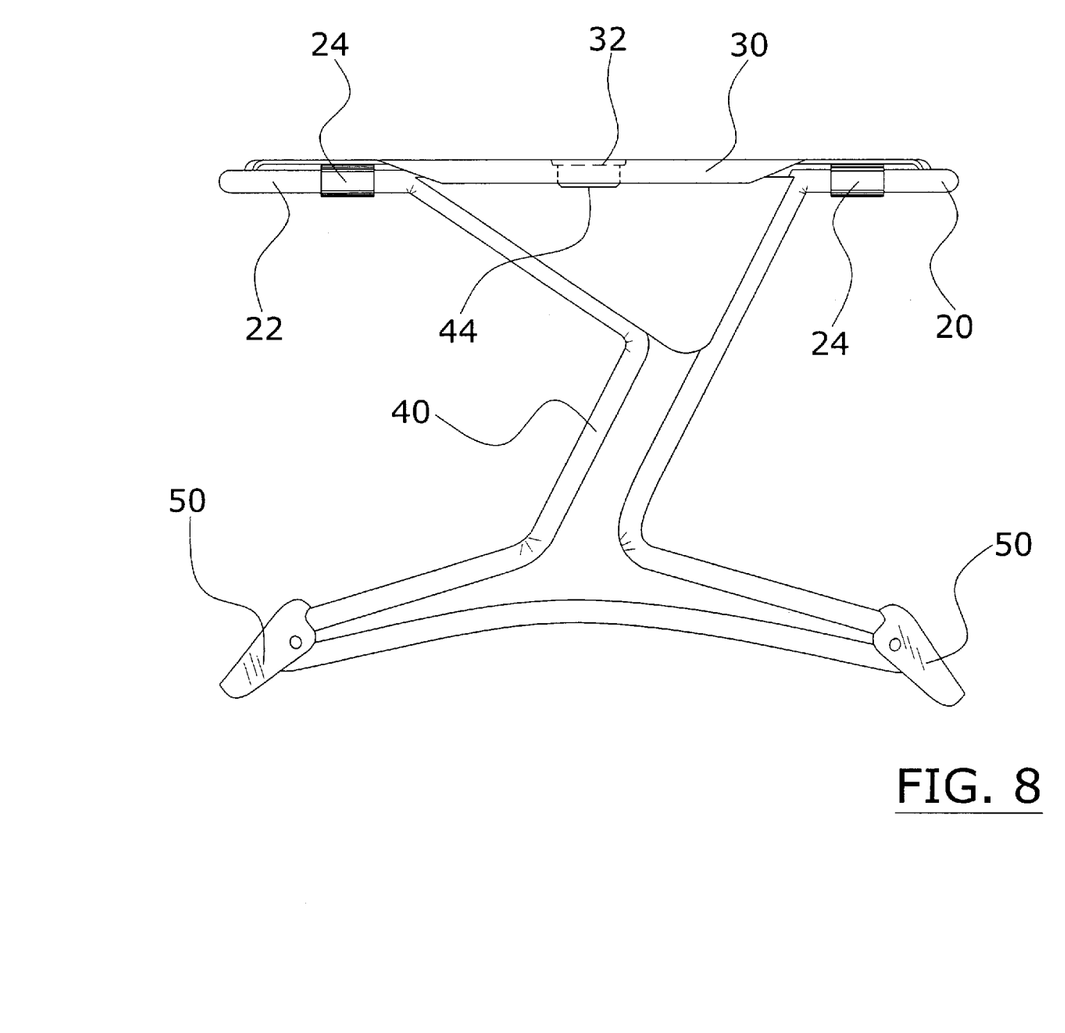
FIG. 8 is a side view of the present invention with the front riser members extended in addition to the rear riser members.

A pair of opposing nub portions 32 preferably extend downwardly from the support platform 30 as shown in FIGS. 2 and 5 of the drawings. A corresponding pair of engaging members 44 attached to the support legs 40, 42 are preferably provided for selectively engaging the nub portions 32 when the support legs 40, 42 are pivoted outwardly into the support position as best illustrated in FIGS. 6, 7 and 8 of the drawings. The engaging members 44 engage the nub portions 32 when the support legs 40, 42 are pivoted outwardly thereby retaining the support legs 40, 42 in the extended support position. The first cable 60 and the second cable 62 prevent the support legs 40, 42 from extending too far as shown in FIG. 3 of the drawings.

As shown in FIGS. 1 through 8 of the drawings, a plurality of front riser members 50 are pivotally attached to a front portion of the support legs 40, 42 and a plurality of rear riser members 50 are pivotally attached to a rear portion of the support legs 40, 42. The riser members 50 allow for adjustment of the height and angle position of the support platform 30 depending upon the desired usage.

In use, the user expands the support legs 40, 42 from the storage position (FIG. 4) to the support position as shown in FIG. 3 of the drawings. The cables 60, 62 and the nub portions 32 and engaging members 44 retain the support legs 40, 42 in the desired extended position. The user then positions the laptop computer 16 support system 10 upon the desired surface such as a table. The laptop computer 16 is then positioned upon the support platform 30 as shown in FIG. 1 of the drawings. The user is then able to connect an external keyboard 12, mouse 14 and other devices to the laptop computer 16 as shown in FIG. 1 of the drawings. The user is able to position the external keyboard 12 below the laptop computer 16 as shown in FIG. 1 of the drawings in order to save space and improve functionality of the laptop computer 16. The user is able to perform hand movements such as reaching for the mouse without obstruction from the support frame, due to front cutouts in support legs 40, 42. When the user is finished utilizing the laptop computer 16, the user simply folds the support legs 40, 42 into the storage position as shown in FIG. 4 of the drawings for storage in a convenient location.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A laptop computer support system, comprising:
   a support frame having at least one support platform, said at least one support platform comprised of a first support platform and a second support platform attached to opposing sides of said support frame with a space between thereof;
   a first support leg pivotally attached to a first side of said support frame;
   a second support leg pivotally attached to a second side of said support frame, wherein said support legs pivot either toward or away from one another;
   a plurality of front riser members pivotally attached to a front portion of said support legs;
   a plurality of rear riser members pivotally attached to a rear portion of said support legs; and
   a pair of opposing nub portions extending downwardly from said support platform and a corresponding pair of engaging members attached to said support legs for selectively engaging said nub portions.

2. The laptop computer support system of claim 1, wherein said support frame has a rectangular structure.

3. The laptop computer support system of claim 1, wherein said support frame is comprised of a rear support frame and a front support frame.

4. The laptop computer support system of claim 3, wherein a plurality of connector members are attached to said rear support frame and said front support frame for pivotally supporting said support legs.

5. The laptop computer support system of claim 1, including a first cable and a second cable attached between said support frame and said support legs.

6. The laptop computer support system of claim 1, including a first cable and a second cable attached between said at least one support platform and said support legs.

7. The laptop computer support system of claim 1, wherein said support platform includes at least one recessed rib.

8. The laptop computer support system of claim 1, wherein said support legs each have a front cutout portion.

9. A laptop computer support system, comprising:
   a support frame having at least one support platform, said at least one support platform comprised of a first support platform and a second support platform attached to opposing sides of said support frame with a space between thereof;
   a first support leg pivotally attached to a first side of said support frame;
   a second support leg pivotally attached to a second side of said support frame, wherein said support legs pivot either toward or away from one another;
   a plurality of front riser members pivotally attached to a front portion of said support legs;
   a plurality of rear riser members pivotally attached to a rear portion of said support legs;
   a first cable and a second cable attached between said support frame and said support legs; and
   a pair of opposing nub portions extending downwardly from said support platform and a corresponding pair of engaging members attached to said support legs for selectively engaging said nub portions.

10. The laptop computer support system of claim 9, wherein said support frame has a rectangular structure.

11. The laptop computer support system of claim 9, wherein said support frame is comprised of a rear support frame and a front support frame.

12. The laptop computer support system of claim 11, wherein a plurality of connector members are attached to said rear support frame and said front support frame for pivotally supporting said support legs.

13. The laptop computer support system of claim 9, wherein said support platform includes at least one recessed rib.

14. The laptop computer support system of claim 9, wherein said support legs each have a front cutout portion.

* * * * *